United States Patent
Ngo

(10) Patent No.: US 8,751,034 B2
(45) Date of Patent: Jun. 10, 2014

(54) NON-HOST INTERFACE FOR MOVING CARTRIDGES IN A CARTRIDGE LIBRARY TO PREVENT BONDING WITH LIBRARY STORAGE SLOTS

(75) Inventor: Khanh Vi Ngo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/250,698

(22) Filed: Sep. 30, 2011

(65) Prior Publication Data

US 2013/0084149 A1 Apr. 4, 2013

(51) Int. Cl.
*B65G 1/04* (2006.01)

(52) U.S. Cl.
USPC ............. 700/214; 710/18; 711/112; 711/113; 345/537

(58) Field of Classification Search
USPC ........................................................ 700/214
See application file for complete search history.

(56) References Cited

U.S. PATENT DOCUMENTS

| | | | | |
|---|---|---|---|---|
| 5,197,055 | A | * | 3/1993 | Hartung et al. ............ 369/30.32 |
| 5,440,686 | A | * | 8/1995 | Dahman et al. ............... 345/537 |
| RE36,286 | E | * | 8/1999 | Hartung et al. .................... 710/8 |
| 6,031,798 | A | * | 2/2000 | James et al. ............... 369/30.28 |
| 6,446,160 | B1 | * | 9/2002 | Le et al. .......................... 711/112 |
| 2007/0039014 | A1 | * | 2/2007 | Pierce et al. ................... 720/630 |
| 2008/0249656 | A1 | * | 10/2008 | Gokhale et al. ............... 700/215 |

FOREIGN PATENT DOCUMENTS

EP 1340228 B1 5/2006

* cited by examiner

*Primary Examiner* — Ramya Burgess
*Assistant Examiner* — Kyle Logan
(74) *Attorney, Agent, or Firm* — John H. Holcombe

(57) ABSTRACT

Cartridges of a computer-implemented cartridge library are moved without host system move commands to avoid bonding of cartridges to storage slots. Via a non-host interface providing external communication with respect to the cartridge library, an inventory list is obtained of cartridges of the cartridge library, bypassing host-based inventory limitations which limit each host's view to its own virtual library. Using the library inventory list, cartridges are identified that have been stored in one storage slot for a period of time that exceeds a threshold. The cartridge library is operated to move the identified cartridges, each moving to a different storage slot than the inventoried storage slot, and a library element address of each moved cartridge is updated without altering a host address for the cartridge.

21 Claims, 6 Drawing Sheets

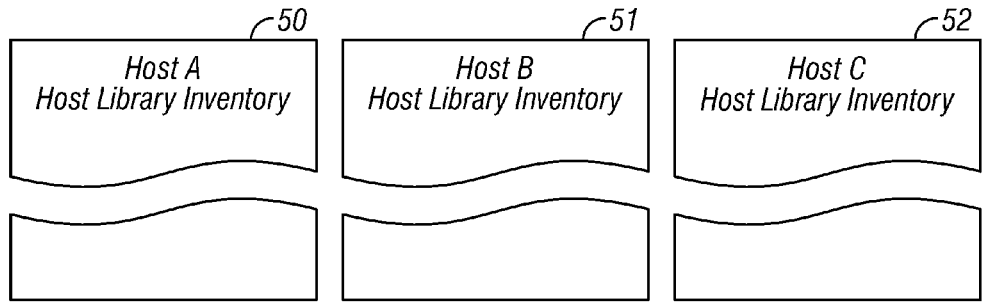

| Library Inventory |||| 
|---|---|---|---|
| Cartridge | Element Address | Timestamp Most Recent Move | Other Information |
|  |  |  |  |
|  |  |  |  |
| 65 | 68 | 69 |  |

FIG. 5

| Move List | | | |
|---|---|---|---|
| Cartridge | Original Element Address | Destination | Sequence No. |
| | | | |

NON-HOST INTERFACE FOR MOVING CARTRIDGES IN A CARTRIDGE LIBRARY TO PREVENT BONDING WITH LIBRARY STORAGE SLOTS

FIELD OF THE INVENTION

This invention relates to computer-implemented automated cartridge libraries, and more particularly to the storage of cartridges in storage slots of the libraries.

BACKGROUND OF THE INVENTION

Computer-implemented automated cartridge libraries, such as automated data storage libraries, comprise large numbers of storage slots, also called storage shelves, in which cartridges, such as data storage cartridges, are stored in position to be accessed by robot accessors that access, move and deliver individual cartridges to data storage drives so that data may be read from or written to the cartridges.

Computer-implemented cartridge libraries, even in the lower cost environments, are able to store cartridges assigned to various host systems, arranged as multiple virtual libraries. In one example, the physical library is split up into two or more virtual libraries where each host is notified of the actual element address of its assigned storage slots and data storage drives in its library. Alternatively, the host's virtual library may be arranged to have virtual element addresses such that the library may move a cartridge to a new storage slot, but keep the same host element address (thus not impacting the host). Each host system maintains an inventory of its element addresses for its cartridges. Whether the library has a single host, multiple hosts with actual element addresses, or multiple hosts with virtual element addresses, the library optionally may maintain cartridges in a "vaulted" state which are not reported to any host system. The library may assign a vaulted cartridge to a host when the host asks for a new cartridge.

The computer-implemented cartridge library maintains a physical inventory of the cartridges, and their library element address in the storage slots, and identifies the physical location of each of the storage slots, comprising, for example, the horizontal "X" and vertical "Y" location of the storage slot on a wall of storage slots, so that the robot accessor can be directed to the desired storage slot. The computer-implemented cartridge library also cross references the virtual library addresses used by the hosts, to the library element addresses of the physical cartridges.

Any one host system has an inventory of cartridges of its virtual library and has no information regarding the other virtual libraries.

The rate of access to the physical cartridges varies by the hosts' desire to access the cartridges to read and/or to write data. This may leave some cartridges in position in a storage slot without being accessed. Also, some cartridges may be new to the library, having been manually placed in the library, and which may be accessed in the future.

In certain instances, cartridges that are left in position in storage slots may bond to their storage slots, to the extent that the robot accessor, when it ultimately attempts to access a cartridge that has been left in position, in response to a move command, has difficulty in removing the cartridge from its storage slot. If the move command fails, the host system is unable to access the data of that cartridge.

SUMMARY OF THE INVENTION

Methods, computer-implemented cartridge libraries, and computer program products are provided for moving cartridges without host system move commands.

In one embodiment of a computer-implemented cartridge library, comprising a plurality of storage slots configured to store cartridges; at least one robot accessor configured to access a cartridge stored in a storage slot and to move the cartridge within the cartridge library; at least one host interface configured to communicate with at least one host system utilizing the cartridge library; and at least one computer processor configured to: operate the robot accessor; provide an ongoing inventory of the cartridges stored in the cartridge library with the library location of the cartridges, and to convert the library locations to virtual locations of the cartridges for the at least one host system; and provide indications of past movements of the cartridges within the library by the at least one robot accessor; the following is performed:

via at least one non-host interface providing external communication with respect to the cartridge library, obtain an inventory list of cartridges of the cartridge library, bypassing host-based inventory limitations which limit each host's view to its own virtual library;

identify cartridges from the library inventory list, that have been stored in one storage slot for a period of time that exceeds a threshold; and via the non-host interface, operate the cartridge library to move the identified cartridges, each moving to a different storage slot than the inventoried storage slot, and to update a library element address of each moved cartridge without altering a host address for the cartridge.

In a further embodiment, the obtaining, identifying, and operating steps are periodically repeated at a predetermined rate via the non-host interface to prevent bonding of cartridges of the cartridge library with storage slots of the cartridge library.

In another embodiment, the at least one non-host interface identifying step comprises parsing information of the library inventory list including location of each cartridge and last access time of each cartridge.

In still another embodiment, the at least one non-host interface identifying step comprises selecting from the library inventory list, each cartridge that fits a criteria:

in a storage slot; and
 last access time exceeds a time threshold.

In a further embodiment, the criteria additionally comprises: each cartridge that is in a storage slot and is without an indicated last access time.

In another embodiment, the at least one non-host interface steps comprise a web-based command line interface (CLI) command application.

In a further embodiment, the non-host interface step of obtaining the library inventory list comprises obtaining a partial inventory list of the library.

For a fuller understanding of the present invention, reference should be made to the following detailed description taken in conjunction with the accompanying drawings.

BRIEF DESCRIPTION OF THE DRAWINGS

FIG. 3 is a diagrammatic illustration of host inventories of data stored in cartridges of the library of FIGS. 1 and 2;

FIGS. 4 and 5 are diagrammatic illustrations of inventories of the cartridges maintained by the library of FIGS. 1 and 2;

FIG. 7 is a diagrammatic illustration of a move list of cartridges of the library of FIGS. 1 and 2.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
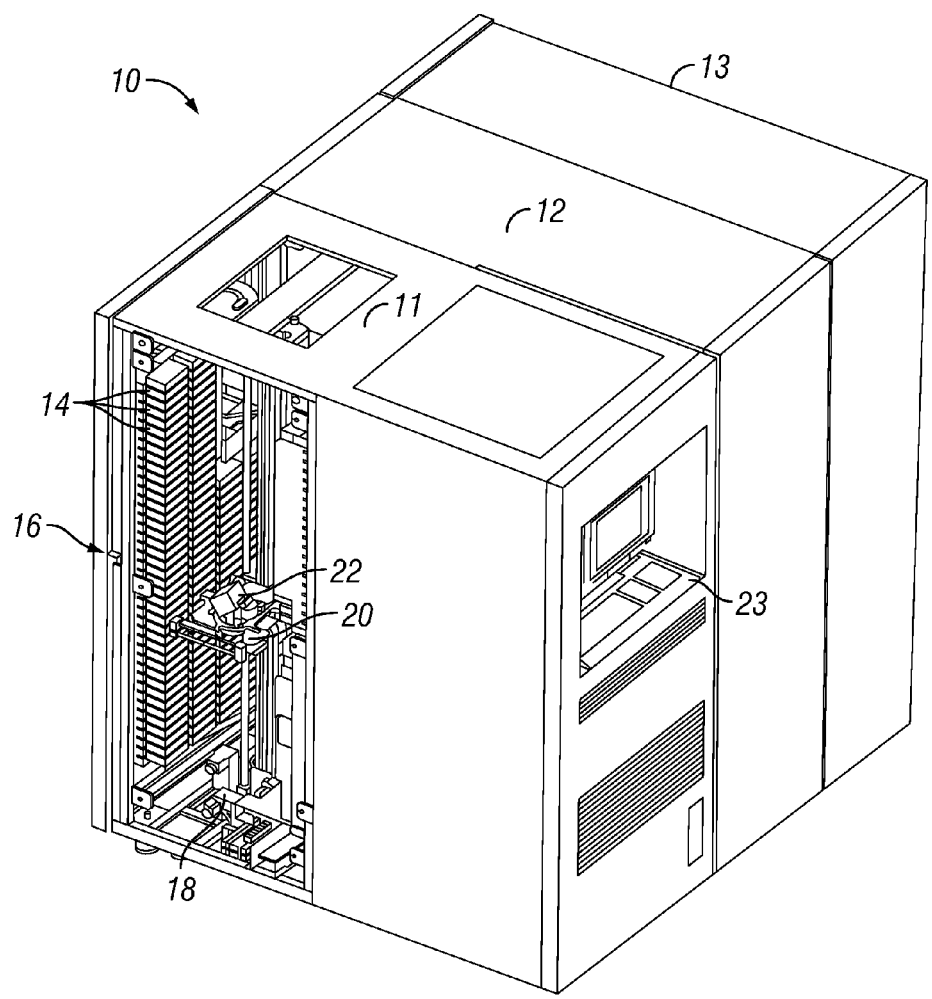
FIG. 1 is an isometric view of a cartridge library which may implement aspects of the present invention.
Figure 2:
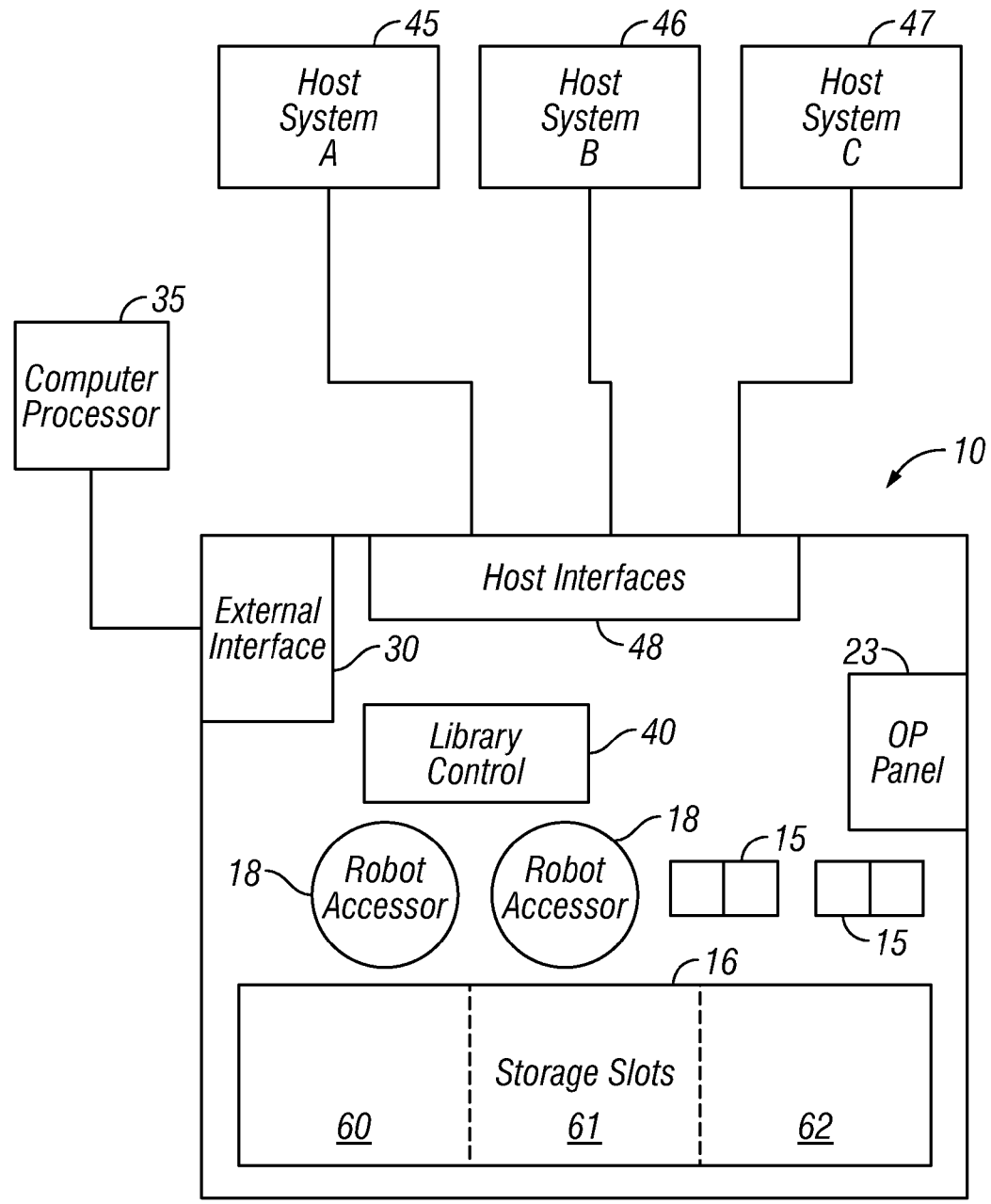
FIG. 2 is a block diagram of the library of FIG. 1 and external devices in communication with the library.
Figure 6:
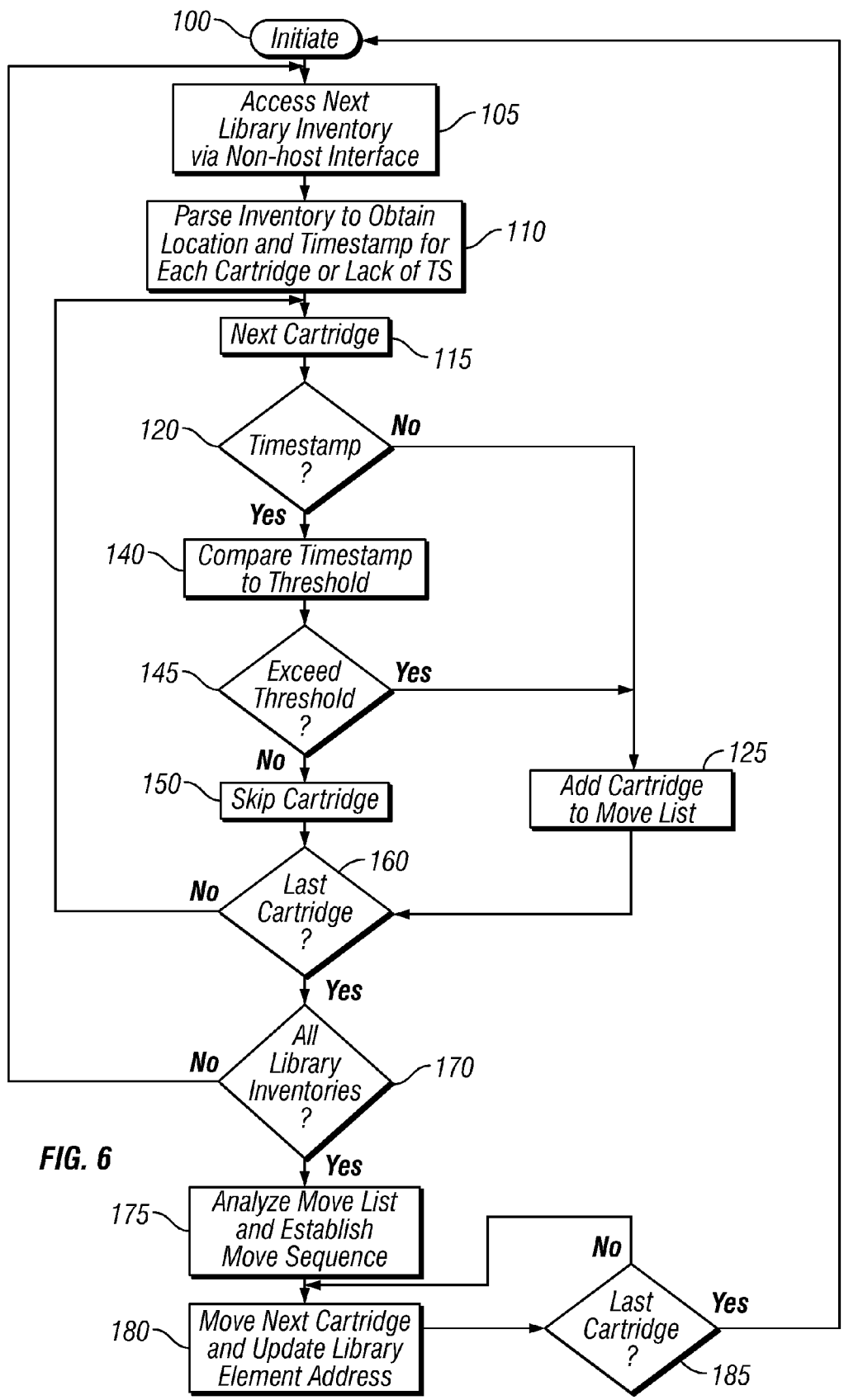
FIG. 6 is a flow chart depicting an embodiment of a method for moving cartridges of the library of FIGS. 1 and 2.

FIGS. 1 and 2 illustrate an example of a cartridge library 10, for example for storing and retrieving data storage cartridges 14 stored in storage slots 16. An example of a cartridge library is the IBM TS 3500 Enterprise Tape Library, which stores magnetic tape cartridges. The cartridge library 10 comprises a base frame 11, may additionally comprise one or more extension frames 12, and may comprise a high availability frame 13.

The base frame 11 of the cartridge library comprises one or more data storage drives 15, and a robot accessor 18. The robot accessor 18 comprises a gripper assembly 20 for gripping a cartridge, and may comprise a bar code scanner or reading system 22 to read identifying labels of the cartridges 14. The robot accessor 18 may access (grip and retrieve) cartridges 14 from storage slots 16, move the cartridges to the data storage drives for reading and or writing data with respect to the cartridges, and return the cartridges to the same or different storage slots and place (put and release) the cartridges to the storage slots. The base frame of the library may comprise an operator's panel 23 and a user interface 30, such as a web-based interface which allows a user, through a computer processor 35, to interact with the library.

The extension frame 12 comprises additional storage slots 16 and may comprise additional data storage drives 15 and/or an operator's panel or user interface. The high availability frame 13 may comprise additional storage slots 16 and data storage drives 15 and comprises a second robot accessor 18. In the event of a failure or other unavailability of the robot accessor 18 of the base frame 11, the second robot accessor 18 may take over. Alternatively, both robot accessors may be operated simultaneously.

A library control 40, which may comprise one or more computer processors, operates the robot accessors 18 and controls the placement of the cartridges 14 in the library.

The library control 40 receives commands from a plurality of host systems 45, 46, 47. The host systems, such as host servers, communicate with the cartridge library 10 either directly via host interfaces 48, or through one or more data storage drives 15, providing commands to access particular cartridges or particular data. The commands are typically logical commands identifying element addresses for accessing the cartridges in the library or in virtual libraries.

Referring additionally to FIG. 3, the cartridge library 10 is partitioned into multiple virtual libraries for access by the plurality of host systems 45, 46, 47. The partitioning comprises configuring the library to assign certain ones of the data storage drives 15 to respective ones of the virtual libraries, and also to assign certain ones of the storage slots 16 to respective ones of the virtual libraries. The host systems 45, 46, 47 each maintains an inventory 50, 51, 52 of its virtual library. The inventory may identify each cartridge and the actual element address (frame, column, row) of each storage slot assigned to the host system. Alternatively the inventory may be arranged to have virtual element addresses which are limited to the host's assigned virtual library. Each host system having virtual element addresses maintains an inventory of its cartridges and virtual, not actual, element addresses for the cartridges. In this instance, the host has no information regarding the actual element addresses nor actual movements of the physical cartridges. The library can move a cartridge to a new storage slot while keeping the same host virtual element address. Thus, each host system has a limited view of the cartridge library 10, comprising only its own virtual library 50, 51, 52 and has no information regarding the other virtual libraries, nor of vaulted cartridges.

The rate of access to the physical cartridges 14 varies by the hosts' desire to access the cartridges to read and/or to write data. This may leave some cartridges in position in a storage slot 16 without being accessed. Also, some cartridges may be new to the library, having been manually placed in the library, and which may be accessed in the future. Vaulted cartridges are unknown to the hosts and are not moved by the hosts.

In certain instances, cartridges 14 that are left in position in storage slots 16 may bond to their storage slots, to the extent that the robot accessor 18, when it ultimately attempts to access a cartridge that has been left in position, in response to a move command, has difficulty in removing the cartridge from its storage slot. If the move command fails, the host system is unable to access the data of that cartridge.

FIGS. 4, 5, 6 and 7 illustrate embodiments of methods for moving selected cartridges 14 of the cartridge library 10 between storage slots 16 of FIGS. 1 and 2.

The library control 40 provides an ongoing inventory 54, 74 of the cartridges 14 stored in the cartridge library 10. The inventory may take any of various forms. For example, separate inventories may be maintained for different portions of the physical library. Alternatively, a single inventory may be maintained for the entire library. For example, the library may comprise virtual libraries with virtual element addresses referenced by each host in its virtual library, but use actual physical element addresses for operating the library, with cross referencing by the library control.

The inventory 54 of FIG. 4 represents the use of host virtual element addresses 66 and an inventory 54 split into separate inventories 55, 56, 57, for example, comprising inventories regarding separate groups of storage slots 60, 61, 62 within the library, such as for the different frames. The inventories may or may not be aligned with the virtual library assignments. The library inventory 54 covers all of the storage slots 16, all of the data storage drives 15, and all of the cartridges 14 in the cartridge library 10.

The library inventory 54 comprises the host's virtual library location, or element address 66, of each of the cartridges that are in the host's virtual library, which addresses are essentially fictitious. The library control 10 provides the corresponding library actual physical address 67 of each of the host cartridges and also lists the physical address of assigned vault cartridges. The addresses may comprise an address of the storage slot, for example in terms of the frame, column and row locations for positioning the gripper 20 of the robot accessor 18.

The library inventory 54 additionally identifies the physical cartridges 65; and provides indications 69 of past movements of the cartridges within the library by the robot accessor(s), for example comprising a timestamp of the most recent move.

The inventory 74 of FIG. 5 represents the use of the actual physical element addresses 68. The host, however, is unaware of any of the assigned vault cartridges, which addresses are also listed by the library in the inventory.

The library inventory 74 additionally identifies the physical cartridges 65; and provides indications 69 of past movements of the cartridges within the library by the robot accessors, for example comprising a timestamp of the most recent move.

In one embodiment, step 100 initiates the process of moving selected cartridges. In one example, step 100 is conducted on a periodic basis, where the period is less than the minimum time at which a cartridge, without being moved, is likely to bond to the storage slot in which it is positioned.

Step 105 accesses the inventory 54, 74 via the non-host interface 30 which provides external communication with respect to the cartridge library, to obtain an inventory list of cartridges of the cartridge library, bypassing host-based inventory limitations which limit each host's 45, 46, 47 view to its own virtual library 50, 51, 52, or 74, without the vault cartridges. In one example, the non-host access to the inventory 54 comprises a web-based command line interface (CLI) command sequence from computer processor 35. The command sequence is arranged to access the entire inventory of the library or a portion, such as a frame of the library, and is unrelated to the limited individual virtual libraries of the hosts. The entire inventory of the library may comprise inventory 54 which may comprise a single inventory or may comprise multiple inventories 55, 56, 57, regarding separate groups of storage slots 60, 61, 62 within the library. The CLI sequence thus may sequence through the multiple inventories.

Various alternatives are provided. In one alternative, each of the inventories 55, 56, 57, is individually accessed by the CLI from the external computer processor 35, via the external interface 30, and the cartridges to be moved are selected and moved, then steps 110 and 105 sequence to the next inventory 55, 56, 57. Alternatively, each of the inventories 55, 56, 57, is accessed by the CLI and steps 110 and 105 sequence to the next inventory 55, 56, 57 immediately, and cartridges to be moved are selected from the sum of all the inventories. Still alternatively, inventory 74 is accessed by the CLI. As the result of step 105, the content of the library inventory or inventories is provided, for example as a library list, to the external computer processor 35, bypassing host-based inventory limitations. As above, the host-based inventories each only covers its own library or virtual library which may be a portion of the overall library and excludes vault cartridges, and can only be accessed by operating each host to access its own library or virtual library inventory, and taking host system time that could otherwise be used by the host for productive purposes.

Included in the library inventory list of step 105 are indications of past movements of the cartridges within the library which, in the illustrated example, comprises the cartridge identification 65 and the timestamp 69 of the most recent move of the cartridge.

In step 110, the external computer processor 35 parses the library inventory list 54, 74 to identify the portion of the library to have the movement algorithm applied, and to identify cartridges from the library inventory list, that have been stored in one storage slot for a period of time that exceeds a threshold. For example, the processor 35 parses the list of all the tape cartridges for the location 66 of the tape cartridge and the last accessed time 69 of the tape cartridge. The processor then selects each cartridge that fits a criteria, where the cartridge has to be in a storage slot; and the last access time, for example the time since the timestamp 29, exceeds a time threshold.

In one example of the criteria, a cartridge is selected if it has not been accessed since (time since the timestamp) for over 7 days.

Additionally, the criteria comprises each cartridge that is in a storage slot and is without an indicated last access time, such as timestamp 29. A lack of a timestamp or an "unknown" or "null" timestamp may indicate that the cartridge was manually loaded into the library.

One example of the process comprises step 115 in which the parsed data relating to the next cartridge in the library inventory list that is identified as being in a storage slot is examined. Step 120 examines the timestamp, and if step 120 indicates that there is no timestamp, or the timestamp is "unknown" or "null", the criteria has been met, and, in step 125, the cartridge is added to a move list 130.

The move list is generated by the external processor 35.

At this stage of the process, move list 130 has an identification 131 of the cartridge and the original location (element address) 132 of the cartridge as obtained from the library inventory list 54. The destination 133 and the sequence 134 of the moves for the cartridge will be determined once the cartridges have been examined.

If step 120 indicates that there is a timestamp for the cartridge, step 140 compares the timestamp to a threshold. The threshold may represent a time difference, and the comparison may be to the elapsed time between the timestamp for the cartridge being examined and the present time. Alternatively, the threshold may be a timestamp value representing the time that a last move would be at the elapsed time limit, and the comparison is to the timestamp value for the cartridge. The threshold is "exceeded" if the timestamp represents that the cartridge has not been accessed within the threshold time. In one example, the time exceeds the threshold elapsed time. Alternatively, the timestamp is below the timestamp value, indicating that the time of the last access precedes the threshold timestamp value.

If step 140 indicates that the threshold has been exceeded, step 145 indicates that the cartridge is added to the move list in step 125.

If step 140 indicates that the threshold has not been exceeded, step 145 indicates that the cartridge is skipped in step 150 and will not be moved as part of the process.

Whether the cartridge being examined has been added to the move list in step 125 or been skipped in step 150, step 160 determines whether any additional cartridges remain in the inventory list to be examined. If cartridges remain to be examined in the inventory list, step 160 returns to step 115 to examine the next cartridge in the inventory list.

If all the cartridges in an inventory list, such as list 55, have been examined, step 170 determines whether any inventory lists remain to be examined. In one example, list 55 may have been examined, but inventory lists 56 and 57 remain to be examined. If so, step 170 returns to step 105 to access the next library inventory list via the non-host interface.

Once all of the inventory lists 54, 74 for the automated cartridge library 10 have been accessed and examined, step 170 causes the external processor 35 to analyze the move list 130 in step 175. The analysis may comprise employing the original element addresses 132 and to set up moves that start at one end of the library, have the least distance for the robot accessor 18 to move, preferably moving the gripper 20 in the vertical direction from storage slot to storage slot in a column of storage slots, and once those moves have been completed, moving the robot accessor in the horizontal direction to another column. The analysis of the move table 130 results in proposed destinations 133 and the move sequence 134 for each cartridge in the move list.

In step 180, the external processor 35 provides CLI commands, via the external interface 30, to the library control 40 to operate the robot accessor(s) 18 to conduct the desired cartridge moves in the desired sequence, and to cause the library control 40 to update the element address 67, 68 of the cartridge that has been moved. Any corresponding host virtual element address 66 is not altered. The process repeats for each cartridge in the move list, with step 185 determining whether all of the cartridges in the move list have been moved.

Once step 185 determines that all of the cartridges in the move list (cartridges whose time since their last move either exceeds a threshold or is unknown) have been moved, the external processor returns control of the robot accessor to the library control 40 and to the host systems 45, 46, 47.

Thus, the host systems have not been burdened with any microcode regarding the issue of cartridges that have been left in one storage slot.

A person of ordinary skill in the art will appreciate that the embodiments of the present invention, disclosed herein, including the computer-implemented system 10, 35 for moving cartridges to prevent bonding in the storage slots 16 of FIG. 1, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transitory computer readable medium(s) having computer readable program code embodied thereon.

Any combination of one or more non-transitory computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a computer-implemented cartridge library, a method for moving cartridges stored in said library, comprising:

obtaining, via a non-host interface of said cartridge library, an inventory list of cartridges of said cartridge library, bypassing host-based inventory limitations; said inventory comprising indications of past movements of said cartridges within said library;

identifying cartridges from said library inventory list, that have been stored in one storage slot for a period of time that exceeds a threshold; and operating, via said non-host interface, said cartridge library to move said identified cartridges, each moving to a different storage slot than said inventoried storage slot, and to update a library element address of each said moved cartridge without altering a host address for said cartridge.

2. The method of claim 1, periodically repeating said obtaining, identifying, and operating steps at a predetermined rate to prevent bonding of cartridges of said cartridge library with storage slots of said cartridge library.

3. The method of claim 1, wherein said identifying step comprises parsing information of said library inventory list including location of each cartridge and last access time of each cartridge.

4. The method of claim 3, wherein said identifying step comprises selecting from said library inventory list, each cartridge that fits a criteria:
 in a storage slot; and
 last access time exceeds a time threshold.

5. The method of claim 4, wherein said criteria additionally comprises: each cartridge that is in a storage slot and is without an indicated last access time.

6. The method of claim 1, wherein said obtaining and operating steps via said non-host interface comprise a web-based command line interface (CLI) command application.

7. The method of claim 6, wherein said step of obtaining said library inventory list comprises obtaining a partial inventory list of said library.

8. A computer-implemented cartridge library, comprising:
 a plurality of storage slots configured to store cartridges;
 at least one robot accessor configured to access a cartridge stored in a storage slot and to move said cartridge within said cartridge library;
 at least one host interface configured to communicate with at least one host system utilizing said cartridge library;
 at least one computer processor configured to:
  operate said robot accessor;
  provide an ongoing inventory of said cartridges stored in said cartridge library with the library location of said cartridges, and to convert said library locations to virtual locations of said cartridges for said at least one host system; and
  provide indications of past movements of said cartridges within said library by said at least one robot accessor; and
 at least one non-host interface providing external communication with respect to said cartridge library, and computer program code of at least one computer processor configured to, via said at least one non-host interface:
  obtain an inventory list of cartridges of said cartridge library, bypassing host-based inventory limitations;
  identify cartridges from said library inventory list, that have been stored in one storage slot for a period of time that exceeds a threshold; and
  operate said cartridge library to move said identified cartridges, each moving to a different storage slot than said inventoried storage slot, and to update a library element address of each said moved cartridge without altering a host address for said cartridge.

9. The computer-implemented cartridge library of claim 8, wherein said at least one non-host interface is additionally configured to: periodically repeat said obtaining, identifying, and operating steps at a predetermined rate to prevent bonding of cartridges of said cartridge library with storage slots of said cartridge library.

10. The computer-implemented cartridge library of claim 8, wherein said at least one non-host interface identifying step comprises parsing information of said library inventory list including location of each cartridge and last access time of each cartridge.

11. The computer-implemented cartridge library of claim 10, wherein said at least one non-host interface identifying step comprises selecting from said library inventory list, each cartridge that fits a criteria:
 in a storage slot; and
 last access time exceeds a time threshold.

12. The computer-implemented cartridge library of claim 11, wherein said criteria additionally comprises: each cartridge that is in a storage slot and is without an indicated last access time.

13. The computer-implemented cartridge library of claim 8, wherein said at least one non-host interface steps comprise a web-based command line interface (CLI) command application.

14. The computer-implemented cartridge library of claim 13, wherein said at least one non-host interface step of obtaining said library inventory list comprises obtaining a partial inventory list of said library.

15. A computer program product for communication with respect to a cartridge library at a non-host interface of said cartridge library, said computer program product comprising computer-usable storage medium having non-transitory computer-usable program code embodied therein, said computer-usable program code comprising:
 computer-usable program code to obtain, via said non-host interface of said cartridge library, an inventory list of cartridges of said cartridge library, bypassing host-based inventory limitations; said inventory comprising indications of past movements of said cartridges within said library;
 computer-usable program code to identify cartridges from said library inventory list, that have been stored in one storage slot for a period of time that exceeds a threshold; and
 computer-usable program code to operate, via said non-host interface, said cartridge library to move said identified cartridges, each moving to a different storage slot than said inventoried storage slot, and to update a library element address of each said moved cartridge without altering a host address for said cartridge.

16. The computer program product of claim 15, wherein said computer-usable program code periodically repeats said obtaining, identifying, and operating steps at a predetermined rate to prevent bonding of cartridges of said cartridge library with storage slots of said cartridge library.

17. The computer program product of claim 15, wherein said computer-usable program code of said identifying step comprises parsing information of said library inventory list including location of each cartridge and last access time of each cartridge.

18. The computer program product of claim 17, wherein said computer-usable program code of said identifying step comprises selecting from said library inventory list, each cartridge that fits a criteria:
 in a storage slot; and
 last access time exceeds a time threshold.

19. The computer program product of claim 18, wherein said criteria additionally comprises: each cartridge that is in a storage slot and is without an indicated last access time.

20. The computer program product of claim 15, wherein said computer-usable program code to obtain and to operate, via said non-host interface, comprise a web-based command line interface (CLI) command application.

21. The computer program product of claim 20, wherein said computer-usable program code of obtaining said library inventory list comprises obtaining a partial inventory list of said library.

* * * * *